(12) United States Patent
Mitsutani

(10) Patent No.: US 9,190,831 B2
(45) Date of Patent: Nov. 17, 2015

(54) POWER SUPPLY SYSTEM, VEHICLE INCORPORATING THE SAME AND METHOD FOR CONTROLLING POWER SUPPLY SYSTEM

(75) Inventor: Noritake Mitsutani, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 173 days.

(21) Appl. No.: 14/007,417

(22) PCT Filed: Mar. 29, 2011

(86) PCT No.: PCT/JP2011/057779
§ 371 (c)(1),
(2), (4) Date: Sep. 25, 2013

(87) PCT Pub. No.: WO2012/131894
PCT Pub. Date: Oct. 4, 2012

(65) Prior Publication Data
US 2014/0022681 A1    Jan. 23, 2014

(51) Int. Cl.
| | |
|---|---|
| B60L 1/00 | (2006.01) |
| B60L 3/00 | (2006.01) |
| H02G 3/00 | (2006.01) |
| H02H 3/28 | (2006.01) |
| B60L 3/04 | (2006.01) |
| B60L 7/14 | (2006.01) |
| B60L 11/12 | (2006.01) |

(Continued)

(52) U.S. Cl.
CPC ............... *H02H 3/28* (2013.01); *B60L 1/003* (2013.01); *B60L 3/0038* (2013.01); *B60L 3/0046* (2013.01); *B60L 3/04* (2013.01); *B60L 7/14* (2013.01); *B60L 11/123* (2013.01); *B60L 11/14* (2013.01); *B60L 11/1859* (2013.01); *B60L 11/1861* (2013.01); *B60L 11/1864* (2013.01); *B60L 11/1868* (2013.01); *B60L 15/007* (2013.01); *B60L 15/2009* (2013.01); *B60L 2210/12* (2013.01); *B60L 2210/14* (2013.01); *B60L 2210/40* (2013.01); *B60L 2240/12* (2013.01); *B60L 2240/421* (2013.01); *B60L 2240/423* (2013.01);

(Continued)

(58) Field of Classification Search
CPC ............................... H02H 3/28; B60L 3/0038
USPC .................... 307/9.1, 10.1; 320/118.134, 136
See application file for complete search history.

(56) References Cited

U.S. PATENT DOCUMENTS

| | | | |
|---|---|---|---|
| 8,508,067 B2 * | 8/2013 | Song et al. ..................... 307/9.1 |
| 2003/0081440 A1 * | 5/2003 | Komatsu et al. .............. 363/132 |

(Continued)

FOREIGN PATENT DOCUMENTS

| | | |
|---|---|---|
| JP | 2008-182779 A | 8/2008 |
| JP | 2008-234903 A | 10/2008 |

(Continued)

*Primary Examiner* — Rexford Barnie
*Assistant Examiner* — Rasem Mourad
(74) *Attorney, Agent, or Firm* — Sughrue Mion, PLLC

(57) ABSTRACT

A power supply system has a power storage device and an ECU, and supplies driving electric power to a load device. The power storage device includes an interrupting device configured to interrupt a conduction path of the power storage device. The load device includes a voltage sensor for detecting a voltage applied to the load device, and supply of electric power from the load device to the power storage device is stopped in response to a failure of the voltage sensor. Where the voltage sensor has failed, the ECU determines presence or absence of activation of the interrupting device, based on a variation length of an actual current that is input to or output from the power storage device and a variation length of a command current set in accordance with requested electric power requested based on a user's operation.

13 Claims, 8 Drawing Sheets

(51) Int. Cl.
  *B60L 11/14*   (2006.01)
  *B60L 11/18*   (2006.01)
  *B60L 15/00*   (2006.01)
  *B60L 15/20*   (2006.01)

(52) U.S. Cl.
  CPC ...... *B60L 2240/441* (2013.01); *B60L2240/443* (2013.01); *B60L 2240/545* (2013.01); *B60L 2240/547* (2013.01); *B60L 2240/549* (2013.01)

(56) References Cited

U.S. PATENT DOCUMENTS

2010/0244558 A1    9/2010   Mitsutani et al.
2011/0140665 A1*   6/2011   Tamezane et al. ............ 320/118
2011/0148361 A1*   6/2011   Yokotani ....................... 320/136
2012/0242144 A1*   9/2012   Chorian et al. ................ 307/9.1
2013/0271086 A1*  10/2013   Mitsutani et al. ............. 320/134

FOREIGN PATENT DOCUMENTS

| | | | |
|---|---|---|---|
| JP | 2009-148139 A | | 7/2009 |
| JP | 2009-171644 A | | 7/2009 |
| JP | 2009171644 A | * | 7/2009 |
| JP | 2009-189209 A | | 8/2009 |
| JP | 2009-278705 A | | 11/2009 |
| JP | 2010-051072 A | | 3/2010 |

* cited by examiner $$IBint(k) = \sum_{i=0}^{k} |IB(i) - IB(i-1)|$$

POWER SUPPLY SYSTEM, VEHICLE INCORPORATING THE SAME AND METHOD FOR CONTROLLING POWER SUPPLY SYSTEM

CROSS REFERENCE TO RELATED APPLICATIONS

This application is a National Stage of International Application No. PCT/JP2011/057779 filed Mar. 29, 2011, the contents of all of which are incorporated herein by reference in their entirety.

TECHNICAL FIELD

The present invention relates to a power supply system, a vehicle incorporating the same, and a method for controlling the power supply system, and more particularly to a technique for detecting activation of a current interrupt device (CID) included in a power storage device.

BACKGROUND ART

In recent years, a vehicle that incorporates a power storage device (for example, a secondary battery, a capacitor, etc.) and runs with driving force generated from electric power stored in the power storage device is attracting attention as an environmentally friendly vehicle. Examples of such vehicles include an electric vehicle, a hybrid vehicle, a fuel-cell vehicle, etc.

Such a power storage device is generally configured to output a desired voltage by stacking a plurality of battery cells in series or in parallel. If a malfunction such as a disconnection or a short circuit occurs in these battery cells, the power storage device may not function properly. It is therefore necessary to detect a malfunction in the battery cells.

Japanese Patent Laying-Open No. 2009-189209 (PTL 1) discloses a power supply apparatus for a vehicle wherein a connecting portion provided between a power storage device and an electric load is brought into a connected state in response to a vehicle start-up instruction, and the presence or absence of a disconnection in a path for supplying operating current from the power storage device to the electric load is diagnosed based on an output from a current sensor obtained when electric power is consumed by the electric load.

CITATION LIST

Patent Literature

PTL 1: Japanese Patent Laying-Open No. 2009-189209
PTL 2: Japanese Patent Laying-Open No. 2009-278705
PTL 3: Japanese Patent Laying-Open No. 2009-148139
PTL 4: Japanese Patent Laying-Open No. 2009-171644
PTL 5: Japanese Patent Laying-Open No. 2010-051072

SUMMARY OF INVENTION

Technical Problem

In some power storage devices, each battery cell is provided with a current interrupt device (hereinafter also referred to as a "CID"). The CID is generally configured such that where an internal pressure of a battery cell has exceeded a prescribed value due to a malfunction in the battery cell, it is activated by the internal pressure to interrupt a conduction path of a power storage device through hardware. Thus, an overvoltage of the power storage device is prevented by the activation of the CID.

In some cases, however, it cannot be directly detected whether the CID has activated or not, and, for example, if a vehicle such as a hybrid vehicle continues to run with the CID being activated, a large voltage is applied to the CID, which can cause a spark inside the battery cell, possibly inviting a secondary failure. It is therefore necessary to quickly detect activation of the CID.

Japanese Patent Laying-Open No. 2009-189209 (PTL 1) and the other patent literatures listed above describe nothing about the CID, nor do they disclose anything about a technique for detecting activation of the CID.

The present invention was made in order to solve this problem, and an object of the invention is to accurately detect activation of a CID in a power supply system provided with a power storage device including a CID.

Solution to Problem

A power supply system according to the present invention has a power storage device and a control device, and supplies driving electric power to a load device. The power storage device includes an interrupting device configured to activate where an internal pressure of the power storage device has exceeded a prescribed value to interrupt a conduction path of the power storage device. The load device includes a voltage detecting unit for detecting a voltage applied to the load device, and supply of electric power from the load device to the power storage device is stopped in response to a failure of the voltage detecting unit. The control device detects presence or absence of activation of the interrupting device based on information from a signal outputting unit different from the voltage detecting unit.

Preferably, the signal outputting unit includes a current detecting unit for detecting an actual current that is input to or output from the power storage device. The control device detects presence or absence of activation of the interrupting device based on the actual current detected by the current detecting unit and a command current to be input to or output from the power storage device set in accordance with requested electric power based on a user's operation.

Preferably, the control device calculates a variation length obtained by accumulating a magnitude of an amount of variation for each sampling period for the actual current, and a variation length obtained by accumulating a magnitude of an amount of variation for each sampling period for the command current, during a prescribed period of time. The control device then determines presence or absence of activation of the interrupting device based on the variation length of the actual current and the variation length of the command current described above.

Preferably, the control device uses a first threshold value and a second threshold value greater than the first threshold value, and determines that the interrupting device has activated when the variation length of the actual current is smaller than the first threshold value, and the variation length of the command current is greater than the second threshold value.

Preferably, a switching device is provided on a path connecting the power storage device and the load device, for switching between a conducting state and a non-conducting state between the power storage device and the load device. The control device switches the switching device into the non-conducting state where it determines that the interrupting device has activated.

Preferably, the signal outputting unit includes auxiliary equipment connected to the power storage device in parallel with the load device. The auxiliary equipment has a device capable of outputting a voltage decrease signal indicating that an input voltage has decreased while driving is being requested. The control device detects presence or absence of activation of the interrupting device based on the voltage decrease signal from the device.

Preferably, the device includes a voltage converting device configured to step down voltage of electric power from the power storage device.

Preferably, a switching device is provided on a path connecting the power storage device and the load device, for switching between a conducting state and a non-conducting state between the power storage device and the load device. The control device switches the switching device into the non-conducting state where it determines that the interrupting device has activated.

A vehicle according to the present invention has a power storage device, a load device including a drive unit configured to generate driving force for the vehicle using electric power from the power storage device, and a control device. The power storage device includes an interrupting device configured to activate where an internal pressure of the power storage device has exceeded a prescribed value to interrupt a conduction path of the power storage device. The load device includes a voltage detecting unit for detecting a voltage applied to the load device, and supply of electric power from the load device to the power storage device is stopped in response to a failure of the voltage detecting unit. The control device detects presence or absence of activation of the interrupting device based on information from a signal outputting unit different from the voltage detecting unit.

Preferably, the signal outputting unit includes a current detecting unit for detecting an actual current that is input to or output from the power storage device. The control device calculates a variation length obtained by accumulating a magnitude of an amount of variation for each sampling period for the actual current detected by the current detecting unit, and a variation length obtained by accumulating a magnitude of an amount of variation for each sampling period for a command current to be input to or output from the power storage device set in accordance with requested electric power based on a user's operation, during a prescribed period of time, and determines presence or absence of activation of the interrupting device, based on the variation length of the actual current and the variation length of the command current.

Preferably, the signal outputting unit includes auxiliary equipment connected to the power storage device in parallel with the load device. The auxiliary equipment has a voltage converting device capable of stepping down voltage of electric power from the power storage device, and outputting a voltage decrease signal indicating that an input voltage has decreased while driving is being requested. The control device detects presence or absence of activation of the interrupting device based on the voltage decrease signal from the voltage converting device.

A method for controlling a power supply system according to the present invention is directed to a method for controlling a power supply system including a power storage device for supplying driving electric power to a load device. The power storage device includes an interrupting device configured to activate where an internal pressure of the power storage device has exceeded a prescribed value to interrupt a conduction path of the power storage device. The load device includes a voltage detecting unit for detecting a voltage applied to the load device. The method includes the steps of detecting a failure of the voltage detecting unit, stopping supply of electric power from the load device to the power storage device in response to the failure of the voltage detecting unit, and detecting presence or absence of activation of the interrupting device based on information from a signal outputting unit different from the voltage detecting unit.

Preferably, the signal outputting unit includes a current detecting unit for detecting an actual current that is input to or output from the power storage device. The step of detecting presence or absence of activation of the interrupting device includes the steps of calculating a variation length obtained by accumulating a magnitude of an amount of variation for each sampling period for the actual current detected by the current detecting unit, during a prescribed period of time, calculating a variation length obtained by accumulating a magnitude of an amount of variation for each sampling period for a command current to be input to and output from the power storage device set in accordance with requested electric power based on a user's operation, during the prescribed period of time, and determining presence or absence of activation of the interrupting device based on the variation length of the actual current and the variation length of the command current.

Preferably, the signal outputting unit includes auxiliary equipment connected to the power storage device in parallel with the load device. The auxiliary equipment includes a voltage converting device capable of stepping down voltage of electric power from the power storage device, and outputting a voltage decrease signal indicating that an input voltage has decreased while driving is being requested. The step of detecting presence or absence of activation of the interrupting device includes the step of detecting presence or absence of activation of the interrupting device based on the voltage decrease signal from the voltage converting device.

Advantageous Effects of Invention

According to the present invention, activation of a CID can be accurately detected in a power supply system provided with a power storage device including a CID.

DESCRIPTION OF EMBODIMENTS

Figure 1:
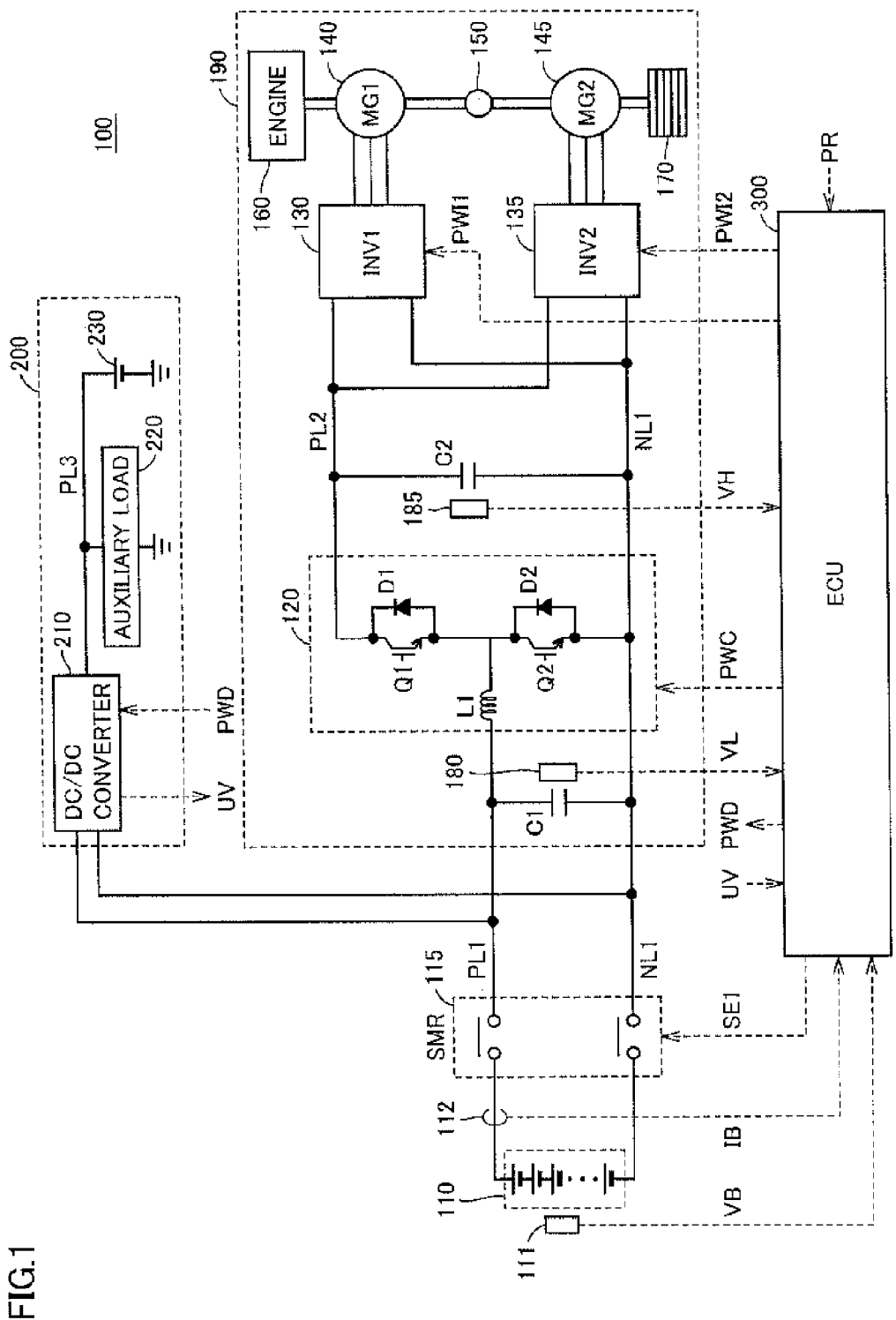
FIG. 1 is an overall block diagram of a vehicle incorporating a power supply system according to an embodiment of the present invention.

Embodiments of the present invention will hereinafter be described in detail with reference to the drawings. In the drawings, identical or corresponding parts are denoted by identical numerals, and description thereof will not be repeated.

[Basic Structure of Vehicle]

FIG. 1 is an overall block diagram of a vehicle 100 including a power supply system according to the present embodiment.

Referring to FIG. 1, vehicle 100 includes a power storage device 110, a system main relay SMR 115, a load device 190, auxiliary equipment 200, and an ECU (Electronic Control Unit) 300, which corresponds to a control device. Load device 190 includes a converter 120, inverters 130, 135, motor generators 140, 145, a power transmission gear 150, an engine 160, a driving wheel 170, voltage sensors 180, 185, which correspond to voltage detecting units, and capacitors C1, C2.

Power storage device 110 is an electric power storing component configured to be chargeable and dischargeable. Power storage device 110 is configured to include a secondary battery such as a lithium ion battery, a nickel-metal hydride battery, or a lead-acid battery, or a power storage element such as an electric double layer capacitor, for example.

Power storage device 110 is connected to a converter 120 through a power line PL1 and a ground line NL1. Power storage device 110 also stores electric power generated by motor generators 140, 145. Power storage device 110 has an output of about 200 V, for example.

Power storage device 110 is provided with a voltage sensor 111 and a current sensor 112. Voltage sensor 111 detects a voltage of power storage device 110 and outputs a detected value VB to ECU 300. Current sensor 112 detects a current that is input to or output from power storage device 110, and outputs a detected value IB to ECU 300. Although FIG. 1 shows the structure in which current sensor 112 is provided on power line PL1 connected to a positive electrode terminal of power storage device 110, current sensor 112 may be provided on ground line NL1 connected to a negative electrode terminal of power storage device 110.

A relay included in SMR 115 is inserted into each of power line PL1 and ground line NL1, which connect power storage device 110 and converter 120. SMR 115 is controlled by a control signal SE1 from ECU 300, and switches between supply and interruption of electric power between power storage device 110 and load device 190.

Capacitor C1 is connected between power line PL1 and ground line NL1. Capacitor C1 reduces voltage fluctuation between power line PL1 and ground line NL1. A voltage sensor 180 detects a voltage VL across capacitor C1 and outputs a detected value to ECU 300.

Converter 120 includes switching elements Q1, Q2, diodes D1, D2, and a reactor L1.

Switching elements Q1 and Q2 are connected in series between power line PL2 and ground line NL1, with the direction from power line PL2 toward ground line NL1 being a forward direction. In the present embodiment, IGBTs (Insulated Gate Bipolar Transistors), power MOS (Metal Oxide Semiconductor) transistors, power bipolar transistors, or the like can be used as the switching elements.

Anti-parallel diodes D1, D2 are connected with switching elements Q1, Q2, respectively. Reactor L1 is provided between a connection node of switching elements Q1 and Q2 and power line PL1.

Switching elements Q1, Q2 are controlled by a control signal PWC from ECU 300, and performs voltage conversion operations between power line PL1 and ground line NL1, and between power line PL2 and ground line NL1.

Converter 120 is basically controlled such that switching elements Q1 and Q2 are turned on or off in a complementary and alternate manner within each switching period. Converter 120 boosts a DC voltage VL to a DC voltage VH at the time of a boosting operation. This boosting operation is performed by supplying electromagnetic energy accumulated in reactor L1 during an ON period of switching element Q2 to power line PL2, through switching element Q1 and antiparallel diode D1.

Converter 120 also steps down the DC voltage VH to the DC voltage VL at the time of a step-down operation. This step-down operation is performed by supplying electromagnetic energy accumulated in reactor L1 during an ON period of switching element Q1 to ground line NL1, through switching element Q2 and antiparallel diode D2.

A voltage conversion ratio (ratio between VH and VL) in each of these boosting operation and step-down operation is controlled by an ON period ratio (duty ratio) between switching elements Q1, Q2 in the above-described switching period. Where the boosting operation and the step-down operation are not necessary (that is, where VH=VL), the voltage conversion ratio can be set to 1.0 (duty ratio=100%) by setting control signal PWC such that switching elements Q1 and Q2 are fixed on and off, respectively.

A capacitor C2 is connected between power line PL2 and ground line NL1, which connect converter 120 and inverters 130, 135. Capacitor C2 reduces voltage fluctuation between power line PL2 and ground line NL1. A voltage sensor 185 detects a voltage VH on capacitor C2 and outputs a detected value to ECU 300.

Inverters 130, 135 are connected in parallel with converter 120 through power line PL2 and ground line NL1. Inverters 130, 135 are controlled by control commands PWI1, PWI2, respectively, from ECU 300, and convert DC electric power output from converter 120 into AC electric power for driving motor generators 140, 145, respectively.

Each of motor generators 140, 145 is an AC rotating electric machine, which is, for example, a permanent magnet type synchronous electric motor provided with a rotor having a permanent magnet embedded therein.

An output torque of each of motor generators 140, 145 is transmitted through a power transmission gear 150 formed of a reduction gear, a power split device, etc., to a driving wheel 170, causing vehicle 100 to run. At the time of regenerative braking operation of vehicle 100, motor generators 140, 145 can generate electric power by rotational force of driving wheel 170. The generated electric power is then converted by inverters 130, 135 into electric power for charging power storage device 110.

Auxiliary equipment 200 includes a DC/DC converter 210, an auxiliary load 220, and an auxiliary battery 230.

DC/DC converter 210 is connected to power line PL1 and ground line NL1 in parallel with load device 190. DC/DC converter 210 steps down voltage of electric power generated by power storage device 110 or motor generators 140, 145, based on a control signal PWD from ECU 300, and supplies the lowered voltage of electric power to auxiliary load 220 and auxiliary battery 230 through power line PL3.

When DC/DC converter 210 detects, during reception of control signal PWD from ECU 300, that an input voltage from power line PL1 and ground line NL1 has decreased to be equal to or lower than a prescribed voltage level, it outputs an undervoltage signal UV to ECU 300.

Auxiliary battery 230 is typically implemented by a lead battery. Auxiliary battery 230 supplies a power supply voltage to loads of a low-voltage system in vehicle 100, such as auxiliary load 220, ECU 300, and the like. Moreover, auxiliary battery 230 is charged with electric power supplied from DC/DC converter 210. Auxiliary battery 230 has an output voltage lower than that of power storage device 110, for example, about 12 V.

Auxiliary load 220 includes devices such as lamps, a wiper, a heater, an audio device, a navigation system, and the like.

Although not shown in FIG. 1, ECU 300 includes a CPU (Central Processing Unit), a storage device, and an input/output buffer, and performs input of signals from various sensors and the like or output of control signals to various devices, and also controls vehicle 100 and various devices. Such control can be performed not only by software processing, but also by processing by dedicated hardware (electronic circuit).

ECU 300 receives detected values of a voltage VB and a current IB from a sensor (not shown) included in power storage device 110. ECU 300 calculates a state of charge (hereinafter also referred to as the SOC (State of Charge)) of power storage device 110, based on voltage VB and current IB.

As will be described below referring to FIG. 2, although power storage device 110 is configured to output a desired voltage by stacking a plurality of battery cells in series, voltage VB detected by voltage sensor 111 is generally calculated based on a sum of voltages of individual battery cells, rather than a voltage across power storage device 100. Therefore, even if a CID activates, the output of voltage VB does not necessarily become zero.

Furthermore, ECU 300 receives requested power PR to be input to or output from power storage device 110, of vehicle driving force set based on a user's operation of an accelerator pedal (not shown). ECU 300 controls converter 120 and inverters 130, 135 based on requested power PR.

Although FIG. 1 shows the structure in which a single control device is provided as ECU 300, control devices may be provided separately for various functions or devices to be controlled, for example, a control device for load device 190 and a control device for power storage device 110.

Figure 2:
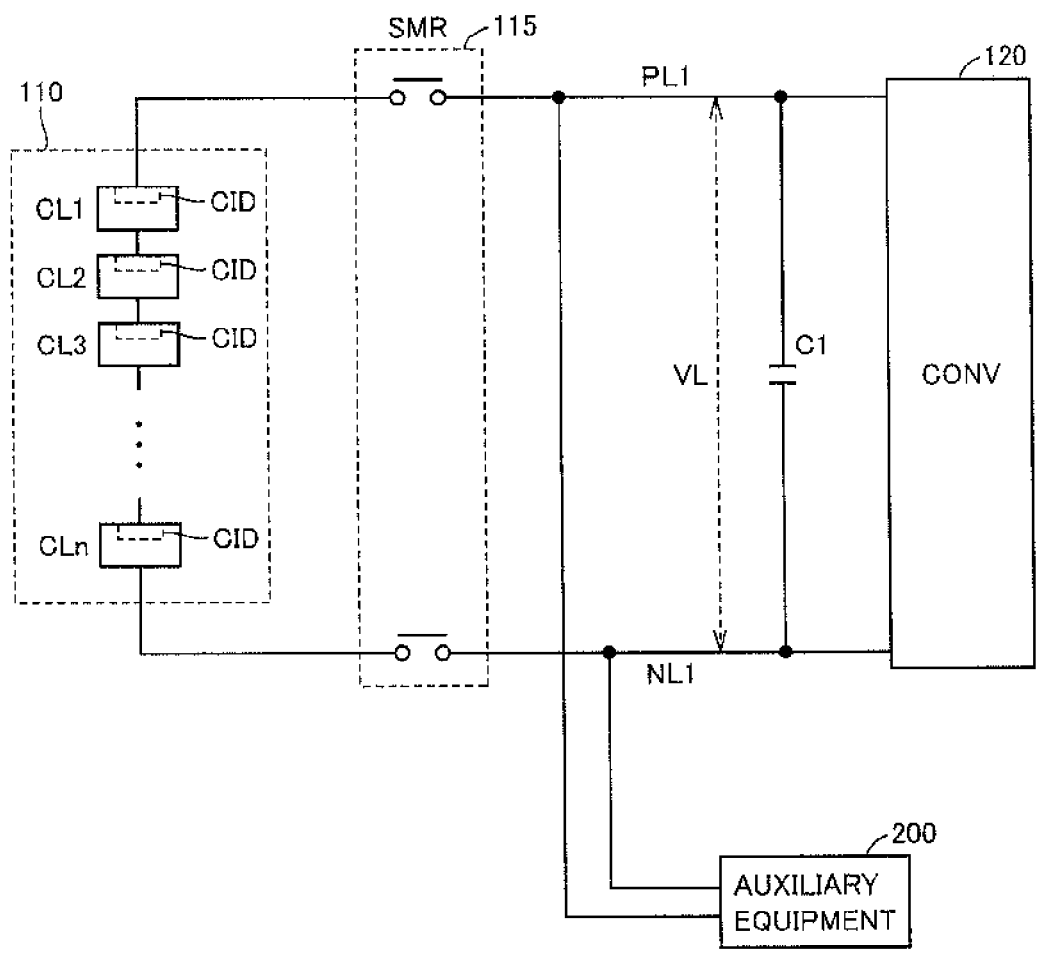
FIG. 2 is a diagram showing a detailed structure of a power storage device.

FIG. 2 is a diagram showing a detailed structure of power storage device 110. Referring to FIG. 2, power storage device 110 is configured to include a plurality of battery cells CL1 to CLn connected in series (hereinafter also collectively referred to as "CL"), and provides a desired output voltage depending on the number of the battery cells CL. Each of these battery cells CL is provided with a current interrupt device CID.

Where an internal pressure of a battery cell CL has exceeded a prescribed value due to gas generated from an electrolyte of the battery cell CL, the CID is activated by the internal pressure to physically interrupt the battery cell from the other battery cells. Therefore, activation of any of the CIDs of the battery cells CL stops the flow of current through power storage device 110.

It is known that when current is interrupted by the activation of a CID, a differential voltage between a total voltage of the battery cells excluding the battery cell of which CID has activated and an input voltage VL to load device 190 is applied to the activated CID. Therefore, with SMR 115 being in a conducting state, if voltage VL decreases due to a reduction in electric charge in capacitor C1 caused by consumption of electric power by load device 190 or auxiliary equipment 200, for example, the voltage applied to the activated CID also increases accordingly. Since a gap formed by a portion interrupted by the CID is small, if the voltage applied to the CID exceeds a prescribed withstand voltage, a secondary failure may be invited, such as occurrence of a spark in the above-described gap, for example. It is therefore necessary to quickly detect activation of the CID. Generally, however, a battery cell CL may not have means for outputting activation of a CID.

Moreover, it has been shown through experiments and the like that activation of a CID causes voltage VL to fluctuate. This is because, due to interruption of charge/discharge between load device 190 and power storage device 110, the amount of charge stored in capacitor C1 fluctuates due to consumption of electric power or power generation by load device 190 and consumption of electric power by auxiliary equipment 200.

For example, where a CID activates at a high load, such as when vehicle 100 is running and consumption of electric power is large, voltage VL decreases sharply, as compared to the case where the CID is not activated. Accordingly, at a high load, it is possible to detect whether a CID has activated or not by monitoring a degree of increase or decrease in voltage VL. Alternatively, it is possible to detect whether a CID has activated or not, by using voltage VH instead of voltage VL.

First Embodiment

If voltage sensors 180, 185 (these sensors will also be collectively referred to as "system voltage sensors", hereinafter) have failed in a vehicle having the structure as described above, voltages on low- and high-voltage sides of converter 120 cannot be recognized by ECU 300, which prevents converter 120 from performing proper voltage conversion operations.

In such a case, for example, gates of switching elements Q1, Q2 in converter 120 may be interrupted to stop the voltage conversion operations to prohibit charging of power storage device 110, while discharging of power storage device 110 only may be permitted to cause the vehicle to continue to run. In this case, control using current IB that is input to or output from power storage device 110, instead of the system voltage sensors, is often performed.

When a CID activates in such a state, current IB that is input to or output from power storage device 110 becomes substantially zero. Current IB, however, may also become zero where, for example, there is no consumption of electric power by load device 190 and auxiliary equipment 200, or where electric power generated and electric power consumed by motor generators 140, 145 are in balance. Therefore, in some cases, activation of a CID cannot be correctly detected by monitoring the behavior of current IB.

In view of this problem, in the first embodiment, a configuration for detecting activation of a CID where the system voltage sensors have a malfunction, based on an actual input/output current IB of power storage device 110 (hereinafter also referred to as "actual current IB") and requested current to be input to or output from power storage device 110 (hereinafter also referred to as "command current IR"), without using detected values of the system voltage sensors, will be described. Specifically, the presence or absence of activation of a CID is detected based on a "variation length" obtained by accumulating variations in magnitude of each of actual current IB and command current IR for each sampling period, during a prescribed period of time. In this way, it is possible to suppress erroneous detection of activation of a CID, and accurately detect activation of a CID.

Here, referring to FIG. 3, an actual current variation length IBint and a command current variation length IRint will be described first. With FIG. 3, description is made taking actual current variation length IBint as an example.

Figure 3:
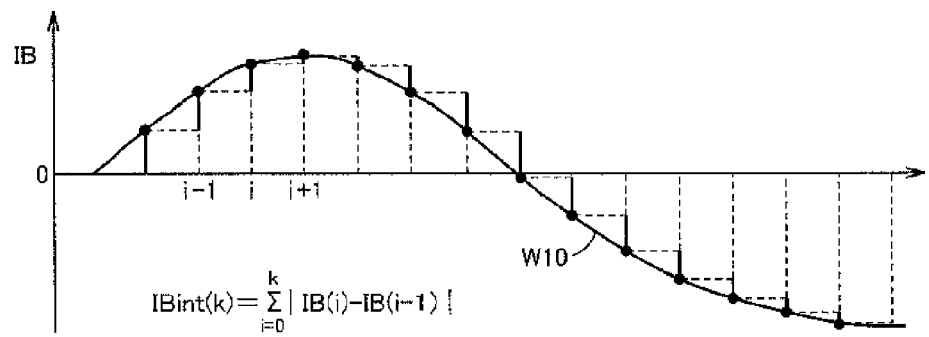
FIG. 3 is a diagram for illustrating a current variation length.

Referring to FIG. 3, a case where current IB that is input to or output from power storage device 110 has varied as represented by line W10 in FIG. 3 is considered. ECU 300 samples current IB that is input to or output from the power storage device in constant periods. A current value for each sampling is represented by each point on line W10, and current values at times t=i−1 and t=i, for example, from the beginning of sampling are denoted as IB (i−1) and IB (i), respectively.

Accordingly, an amount of current variation ΔIB (i) from time t=i−1 to time t=i is expressed by the following equation (1):

$$\Delta IB(i) = |IB(i) - IB(i-1)| \quad (1).$$

Here, assuming that k is the number of sampling times within a predetermined period of time T0, actual current variation length IBint (k) is expressed by the following equation (2):

$$IBint(k) = \Sigma |IB(i) - IB(i-1)| \quad (2)$$

(i=1, k)

That is, actual current variation length IBint can be an index indicating how much actual current IB has varied in a vibratory manner within the prescribed period of time T0. Therefore, for example, even if an average value of actual currents IB during the period of time T0 is the same, the more the current varies in a vibratory manner during that period, the greater the value of actual current variation length IBint becomes.

Figure 4:
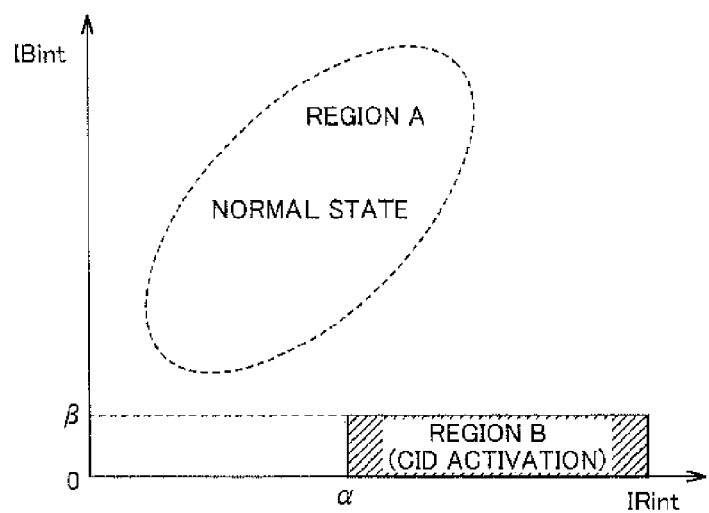
FIG. 4 is a diagram for illustrating a relationship between actual current variation length and command current variation length, and vehicle state.

Next, a technique for determining activation of a CID using actual current variation length IBint and command current variation length IPint is described referring to FIG. 4. In FIG. 4, the horizontal axis represents command current variation length IRint, and the vertical axis represents actual current variation length IBint.

Referring to FIGS. 1 and 4, when power storage device 110 is in a normal state with a CID not activated, the values of command current IR and actual current IB are generally equal, taking into account a time delay such as a control delay. Hence, actual current variation length IBint and command current variation length IRint are plotted within a range of region A surrounded by the dotted line shown in FIG. 4.

Conversely, when a CID has activated, input/output of a current to/from power storage device 110 is stopped, and therefore, although command current variation length IRint increases with time, actual current variation length IBint becomes substantially zero.

That is, activation of the CID can be determined by detecting that command current variation length IRint is equal to or greater than a threshold value α (α>0), and actual current variation length IBint is in a range smaller than a threshold value β (0≤β<α) (that is, range B in FIG. 4), while taking into account a detection error of current sensor 112, a calculation error of command current IR, etc.

Figure 5:
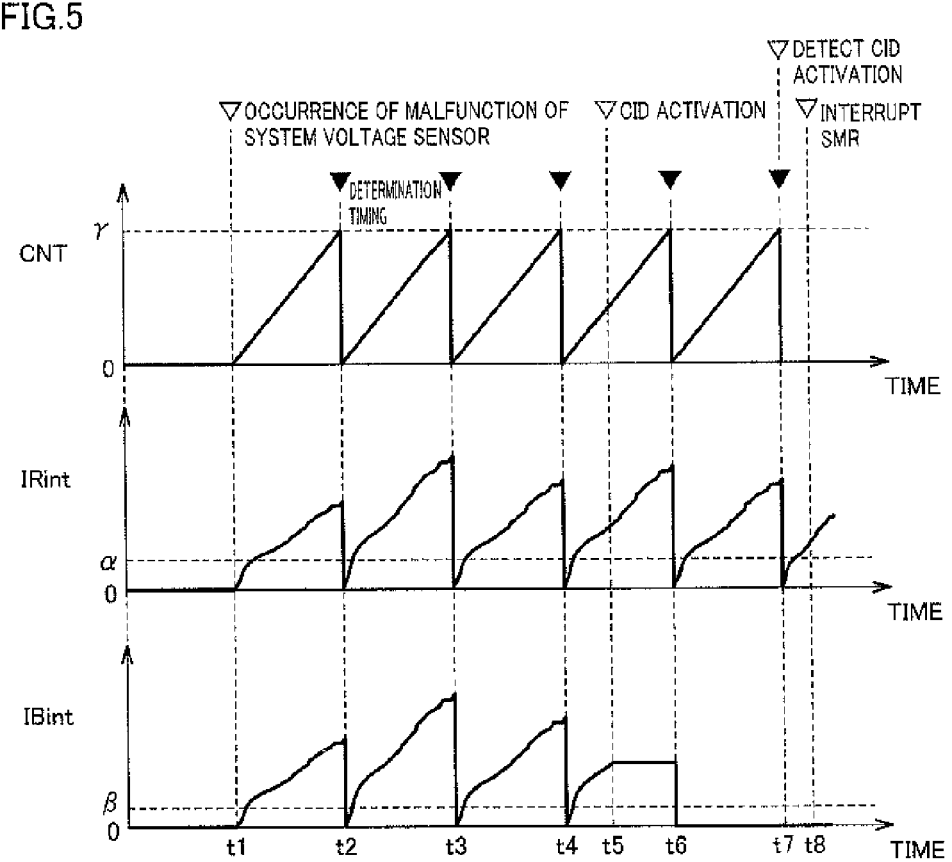
FIG. 5 is a time chart for illustrating an outline of control of detection of CID activation in a first embodiment.

FIG. 5 is a time chart for illustrating an outline of control of detection of CID activation in the first embodiment. In FIG. 5, the horizontal axis represents time, and the vertical axis represents actual current variation length IBint (lower column), command current variation length IRint (middle column), and counter CNT (upper column) showing an accumulated time for each variation length.

Referring to FIG. 5, until time t1, at least one of voltage sensors 180, 185, which correspond to the system voltage sensors, is in a normal state, and activation of a CID is being monitored based on that sensor. An accumulation process for actual current variation length IBint and command current variation length IRint is not performed, and counter CNT also remains zero.

At time t1, where both of the system voltage sensors have a malfunction, the gates of switching elements Q1, Q2 in converter 120 are interrupted, and at the same time, the accumulation process for actual current variation length IBint and command current variation length IRint is begun.

Since the gates of switching elements Q1, Q2 in converter 120 are interrupted, and only discharging of power storage device 110 can be executed, both actual current IB and command current IR have positive values.

When counter CNT has then reached a threshold value γ showing a prescribed reference time (time t2) for determining activation of a CID, the values of command current variation length IRint and actual current variation length IBint at the time are compared with above-described threshold values α and β, respectively.

At time t2, IRint>α and IBint>β, which is outside range B described with FIG. 4, and thus it is determined that a CID is not activated. Then, after completion of the determination, command current variation length IRint, actual current variation length IBint, and counter CNT are reset to initial values.

Similarly, at determination timings of times t3 and t4, it is determined that a CID is not activated, as was at time t2.

Then, when a CID activates at time t5 while the accumulation process is being executed again from time t4, command current variation length IRint continues to increase with time. On the other hand, actual current variation length IBint is maintained at the same value from time t5 to the subsequent determination timing, time t6, because output of a current from power storage device 110 is stopped by the activation of the CID.

In the example shown in FIG. 5, although the CID activates at the determination timing of time t6, command current variation length IRint and actual current variation length IBint are both greater than their threshold values. Therefore, activation of the CID is not detected yet at time t6.

However, after each of accumulated values is reset to the initial value at time t6, although command current variation length IRint increases with time, actual current variation length IBint is maintained at the initial value.

Then, at the next determination timing, time t7, IRint>α and IBint<β, which is within range B shown in FIG. 4. Activation of the CID is thus determined. In response to this, SMR 115 is interrupted.

Figure 6:
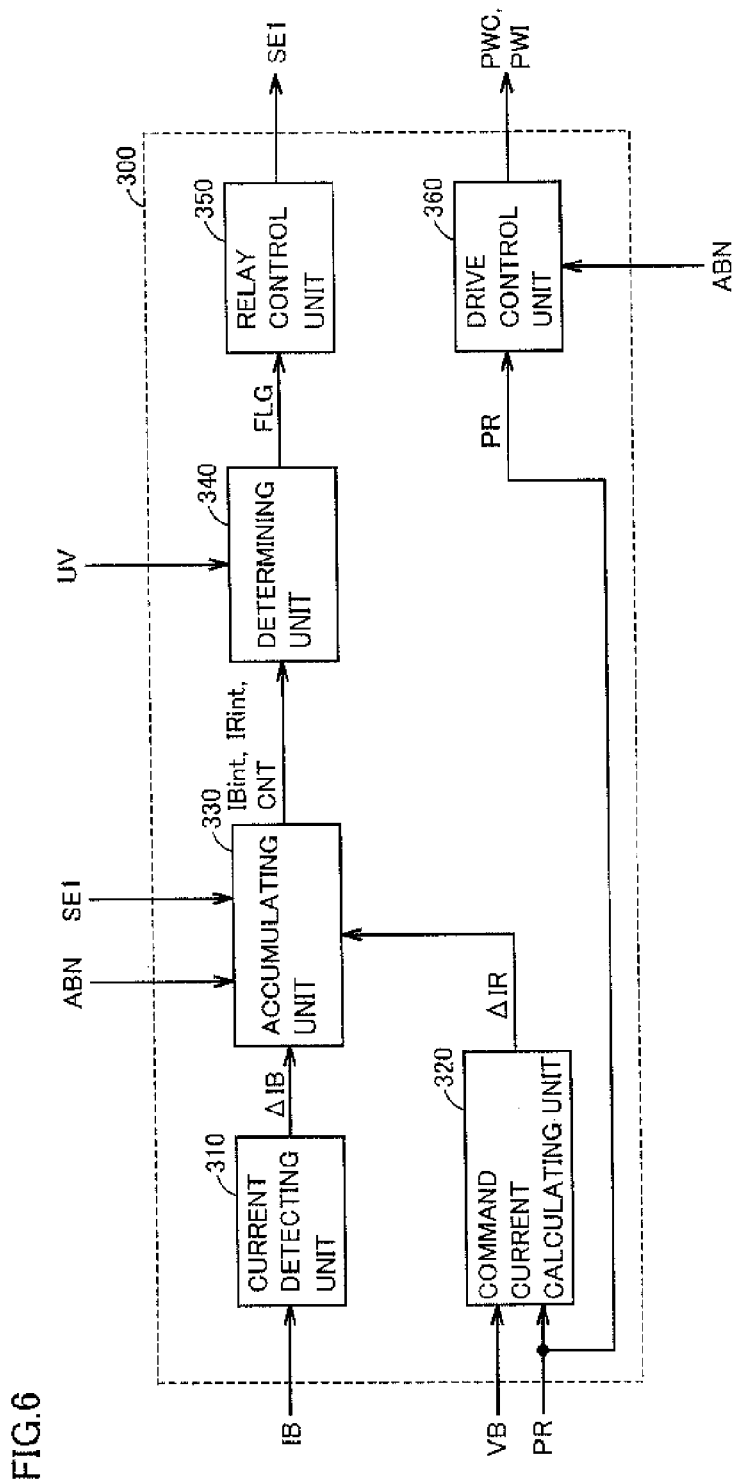
FIG. 6 is a functional block diagram for illustrating the control of detection of CID activation executed by an ECU in the first embodiment.

FIG. 6 is a functional block diagram for illustrating the control of detection of CID activation executed by ECU 300 in the first embodiment. Each of the functional blocks shown in the functional block diagram of FIG. 6 is implemented by hardware or software processing by ECU 300.

Referring to FIG. 6, ECU 300 includes a current detecting unit 310, a command current calculating unit 320, an accumulating unit 330, a determining unit 340, a relay control unit 350, and a drive control unit 360.

Current detecting unit 310 receives actual current IB that is input to or output from power storage device 110, which has been detected by current sensor 112. Current detecting unit 310 calculates an amount of variation ΔIB in current IB from a current value detected in a previous sampling period. Current detecting unit 310 then outputs amount of variation ΔIB in actual current IB to accumulating unit 330.

Command current calculating unit 320 receives requested power PR to be input to or output from power storage device 110 and voltage VB of power storage device 110 detected by voltage sensor 111. Based on these items of information, command current calculating unit 320 calculates command current IR to be input to or output from power storage device 110. Specifically, command current IR is calculated in accordance with IR=PR/VB.

Command current calculating unit 320 also calculates an amount of variation ΔIR from a command current calculated in the previous sampling period. Command current calculating unit 320 then outputs amount of variation ΔIR in command current IR to accumulating unit 330.

Accumulating unit 330 receives amount of variation ΔIB in actual current IB from current detecting unit 310 and amount of variation ΔIR in command current from command current calculating unit 320. Accumulating unit 330 also receives control signal SE1 for driving SMR 115 and a malfunction signal ABN indicating that the system voltage sensors have a malfunction.

Where SMR 115 is placed in a conducting state by control signal SE1, and abnormal signal ABN is indicating that the system voltage sensors have a malfunction, accumulating unit 330 accumulates amounts of variation ΔIB in actual current IB and amounts of variation ΔIR in command current IR for each sampling period, thereby calculating actual current variation length IBint and command current variation length IRint. Accumulating unit 330 also accumulates counters CNT representing a time during which accumulation is executed (monitoring time).

Accumulating unit 330 then outputs calculated actual current variation length IBint, command current variation length IRint, and counter CNT to determining unit 340. When counter CNT has reached a count value corresponding to the predetermined reference time, and the output to determining unit 340 has completed, accumulating unit 330 resets the values of actual current variation length IBint, command current variation length IRint, and counter CNT to zero.

Determining unit 340 receives actual current variation length IBint, command current variation length IRint, and counter CNT from accumulating unit 330. Determining unit 340 also receives an undervoltage signal UV from DC/DC converter 210. Based on these items of information, determining unit 340 determines whether a CID has activated or not, in accordance with the technique as described with FIGS. 4 and 5, and sets a determination flag FLG. For example, where it is determined that a CID has activated, determination flag FLG is set to ON, and where it is determined that a CID is not activated, the determination flag is set to OFF. Determining unit 340 subsequently outputs set determination flag FLG to relay control unit 350.

Relay control unit 350 receives determination flag FLG from determining unit 340. Where determination flag FLG is turned ON, i.e., a CID has activated, relay control unit 350 opens SMR 115 by control signal SE1.

Drive control unit 360 receives requested power PR and malfunction signal ABN indicating that the system voltage sensors have a malfunction. Drive control unit 360 generates control signals PWC, PWI for controlling converters 120 and inverters 130, 135, based on requested power PR. Where the system voltage sensors have a malfunction, drive control unit 360 causes the gates of switching elements Q1, Q2 in converter 120 to be interrupted to prohibit the charging operation of power storage device 110 with generated electric power by way of inverters 130, 135, and permits the discharging operation of power storage device 110 only.

Instead of interrupting the gates of switching elements Q1, Q2 in converter 120, it is also possible to fix switching element Q1 only in an ON state. While this has the advantage of allowing regenerative operation, it also involves the risk of overcharging of power storage device 110, and therefore, it is preferred to interrupt the gates, from the standpoint of protecting power storage device 110.

Figure 7:
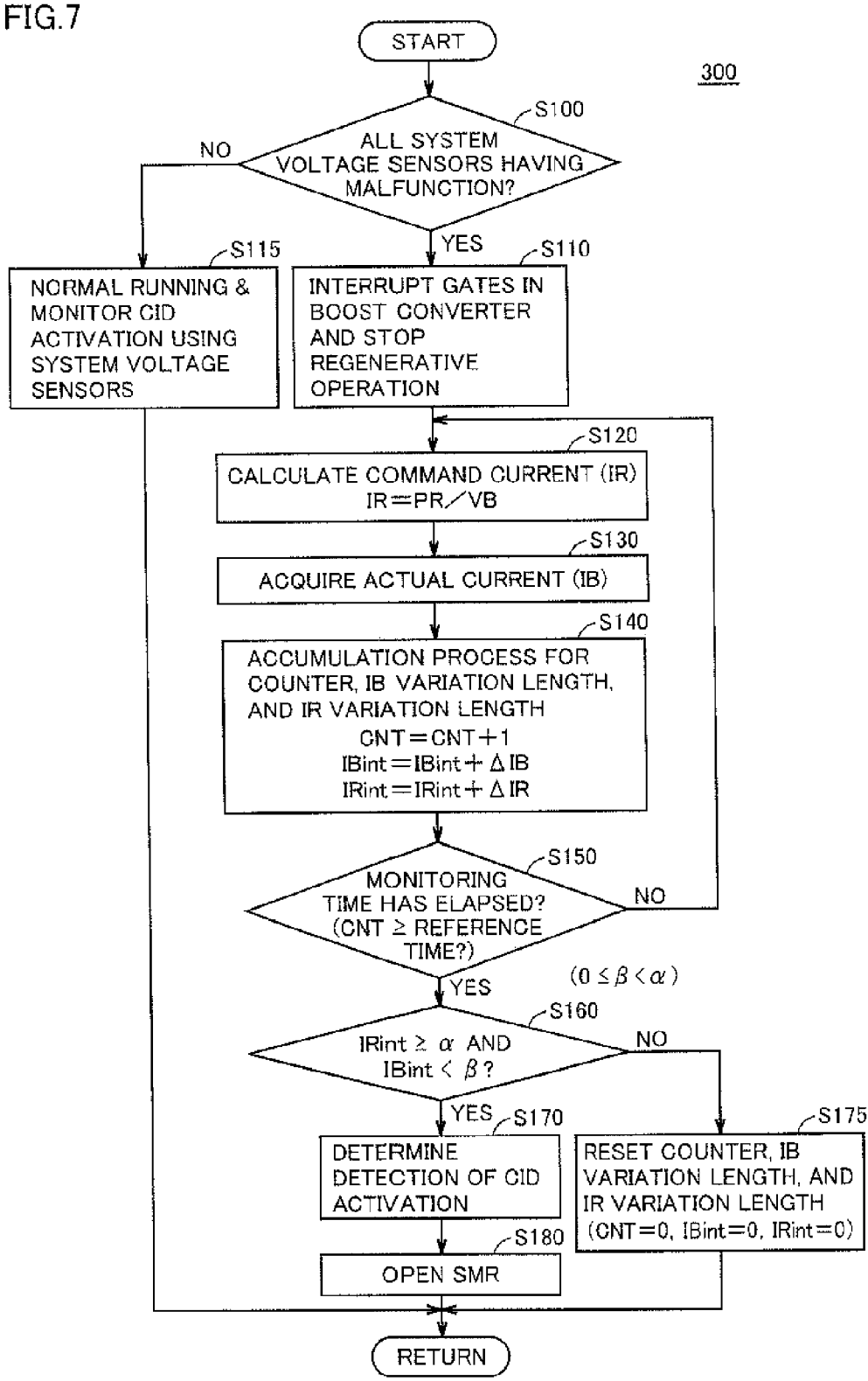
FIG. 7 is a flowchart for illustrating details of processing of the control of detection of CID activation executed by the ECU in the first embodiment.
Figure 8:
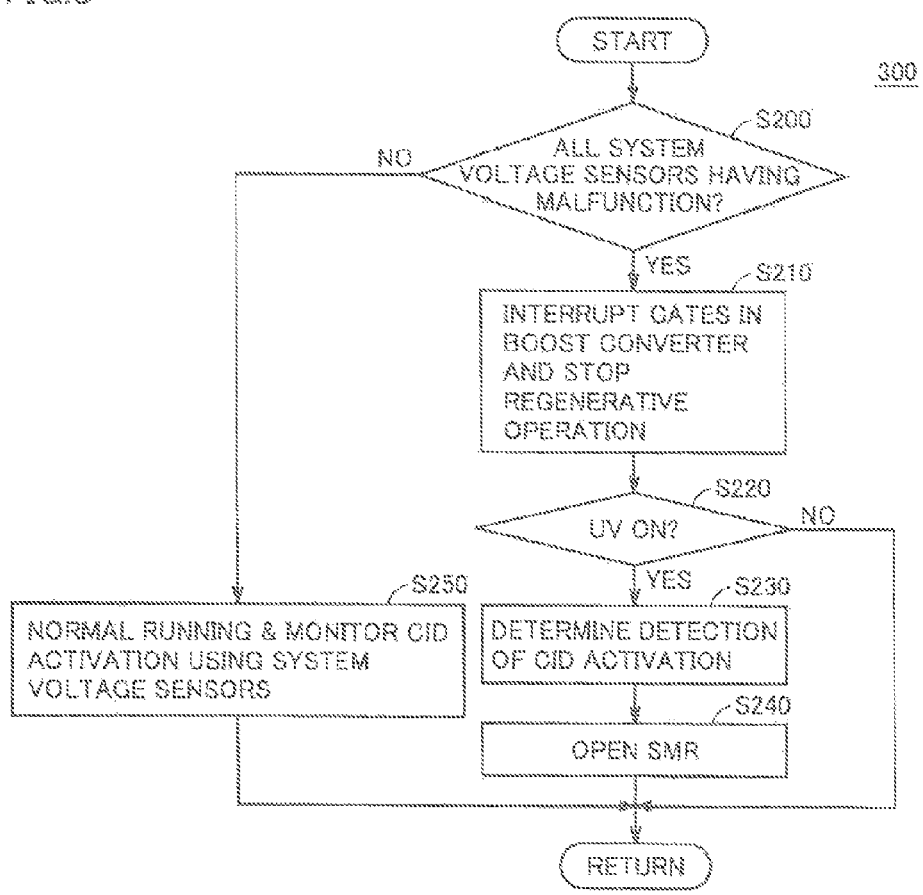
FIG. 8 is a flowchart for illustrating details of processing of the control of detection of CID activation executed by the ECU in a second embodiment.
Figure 9:
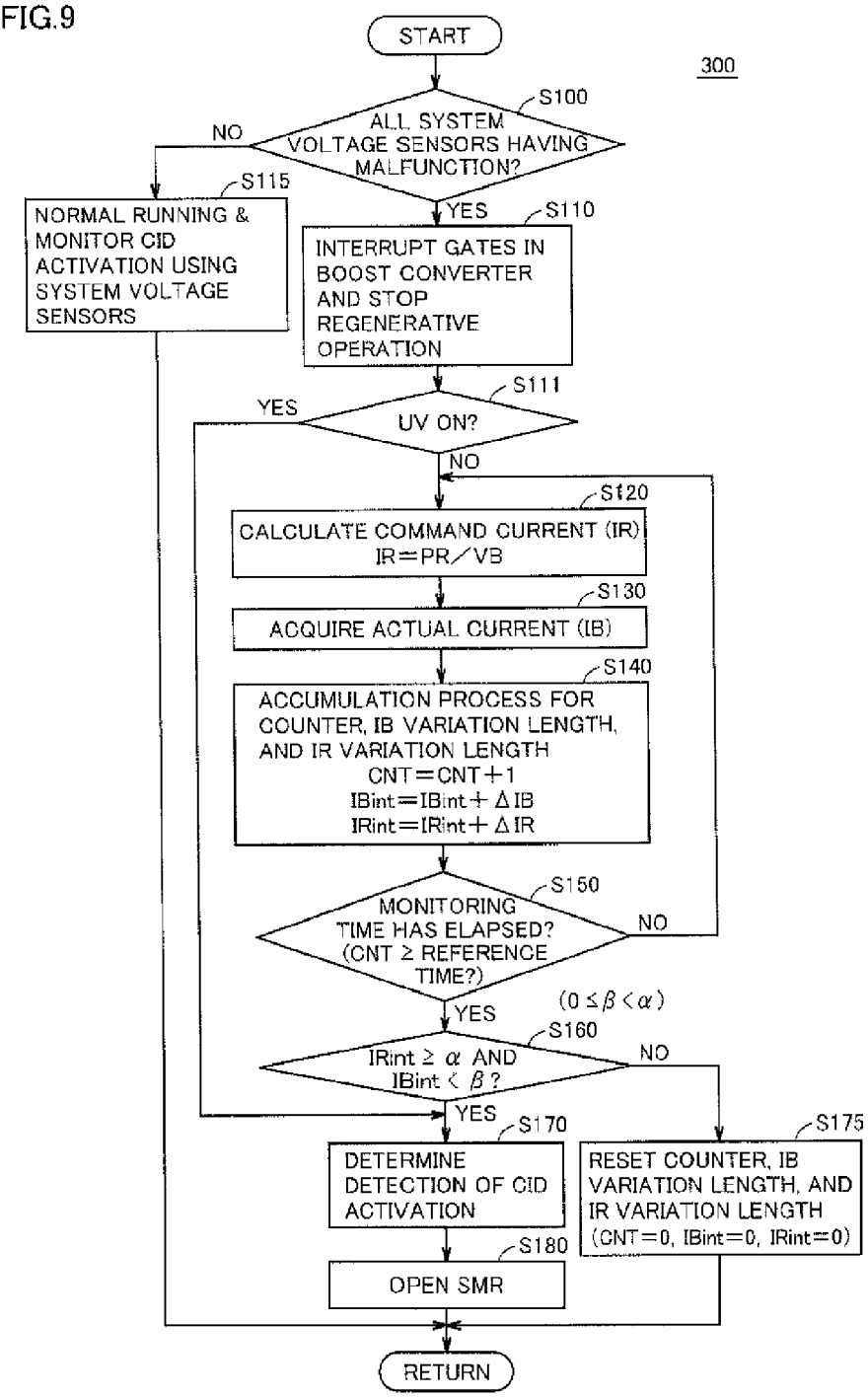
FIG. 9 is a flowchart for illustrating details of processing of the control of detection of CID activation executed by the ECU in a third embodiment.

FIG. 7 is a flowchart for illustrating details of processing of the control of detection of CID activation executed by ECU 300 in the first embodiment. The processing of the flowchart shown in each of FIG. 7 and below-described FIGS. 8 and 9 is implemented by invoking a program prestored in ECU 300 from a main routine, and executing the program in prescribed periods. Alternatively, the processing in some steps can be implemented by dedicated hardware (electronic circuit).

Referring to FIGS. 1 and 7, in step ("step" is hereinafter abbreviated to "S") 100, ECU 300 determines whether both of the system voltage sensors (voltage sensors 180, 185) have a malfunction or not.

Where at least one of the system voltage sensors is in a normal state (NO in S100), the processing proceeds to S115, where ECU 300 executes monitoring of CID activation based on the values of the system voltage sensors in a normal state, while causing the vehicle to run normally.

Where both of the system voltage sensors have a malfunction (YES in S100), the processing proceeds to S110, where ECU 300 interrupts the gates of switching elements Q1, Q2 in converter 120, and also causes regenerative operation to stop.

ECU 300 then calculates command current IR based on requested power PR and voltage VB of power storage device 110 (S120), and also acquires actual current IB from current sensor 112 (S130).

Subsequently in S140, ECU 300 starts counter CNT, and also calculates variation length IBint of actual current IB and variation length IRint of command current IR.

In S150, ECU 300 determines whether a predetermined monitoring time has elapsed or not, based on a count value of counter CNT.

Where the predetermined monitoring time has not elapsed yet (NO in S150), the processing from S120 to S140 is repeated to further count up the counter and continue the accumulation process for actual current variation length IBint and command current variation length IRint.

Where the prescribed monitoring time has elapsed (YES in S150), the processing proceeds to S160, where it is determined whether or not command current variation length IRint is equal to or greater than the threshold value α, and whether or not actual current variation length IBint is smaller than the threshold value β, as described with FIG. 4.

Where command current variation length IRint is equal to or greater than the threshold value α, and actual current variation length IBint is smaller than the threshold value β (YES in S160), the processing proceeds to S170, where ECU 300 determines that a CID has activated. The processing subsequently proceeds to S180, where ECU 300 opens SMR 115.

Conversely, where command current variation length IRint is smaller than the threshold value α, or actual current variation length IBint is equal to or greater than the threshold value β (NO in S160), ECU 300 determines that the possibility that a CID has activated is low, and causes the processing to proceed to S175, where it resets the accumulated values of counter CNT, command current variation length IRint, and actual current variation length IBint to the initial values, and returns the processing to the main routine.

Although not shown, similarly where it is determined that a CID has activated, the accumulated values of counter CNT, command current variation length IRint, and actual current variation length IBint are reset to the initial values.

By performing the control in accordance with the foregoing processing, it is possible to correctly determine activation of a CID, even where the system voltage sensors have a malfunction.

Second Embodiment

In the first embodiment, the configuration for detecting activation of a CID where the system voltage sensors have a malfunction, using the actual current variation length and the command current variation length, has been described.

As described in the first embodiment, where the system voltage sensors have a malfunction, the gates of switching elements Q1, Q2 in converter 120 in FIG. 1 are interrupted, whereby capacitor C1 is charged only with the electric power supplied from power storage device 110.

When a CID activates in such a state, electric power to be consumed by motor generators 140, 145 and auxiliary equipment 200 is supplied from the electric power stored in capacitor C1. Since the CID has activated, however, capacitor C1 is not charged by power storage device 110, and consequently, the voltage across capacitor C1 (that is, voltage VL) gradually decreases.

Here, in the configuration shown in FIG. 1, since an input voltage of DC/DC converter 210 included in auxiliary equipment 200 decreases, DC/DC converter 210 cannot be activated if the voltage across capacitor C1 decreases below a prescribed voltage level, resulting in output of undervoltage signal UV from DC/DC converter 210.

Accordingly, in the second embodiment, the decrease in voltage VL is determined indirectly based on undervoltage signal UV from DC/DC converter 210, whereby activation of a CID is detected.

FIG. 8 is a flowchart for illustrating details of processing of the control of detection of CID activation executed by ECU 300 in the second embodiment.

Referring to FIGS. 1 and 8, in step 200, ECU 300 determines whether or not both of the system voltage sensors have a malfunction.

Where at least one of the system voltage sensors is in a normal state (NO in S200), the processing proceeds to S250, where ECU 300 executes monitoring of CID activation based on the values of the system voltage sensors in a normal state, while causing the vehicle to run normally.

Where both of the system voltage sensors have a malfunction (YES in S200), the processing proceeds to S210, where ECU 300 interrupts the gates of switching elements Q1, Q2 in converter 120, and also causes regenerative operation to stop.

Next, ECU 300 determines in S220 whether or not undervoltage signal UV from DC/DC converter 210 is ON.

Where undervoltage signal UV is OFF (NO in S220), ECU 300 determines that a CID is not activated, and returns the processing to the main routine.

Where undervoltage signal UV is ON (YES in S220), the processing proceeds to S230, where ECU 300 determines that a CID has activated. The processing subsequently proceeds to S240, where ECU 300 opens SMR 115.

By performing the control in accordance with the foregoing processing, it is possible to correctly determine activation of a CID, even where the system voltage sensors have a malfunction.

While the foregoing has described the configuration of detecting activation of a CID using undervoltage signal UV from DC/DC converter 210, activation of a CID may also be detected based on a signal from a device different from DC/DC converter 210, so long as a signal similar to undervoltage signal UV can be output. Such a device includes, for example, an air-conditioning device (not shown) connected to power line PL1 and ground line NL1 in parallel with auxiliary equipment 200, and the devices described as auxiliary load 200.

Third Embodiment

The third embodiment shows an example of a case where the foregoing first and second embodiments are combined.

The configuration according to the second embodiment does not require the calculation process for current variation lengths as in the first embodiment, thus achieving a simplified configuration as control logic. However, timing of detecting activation of a CID may be delayed because activation of a CID is not detected until voltage VL, which corresponds to the input voltage of DC/DC converter, decreases to a prescribed voltage level.

The configuration according to the first embodiment, on the other hand, always requires the calculation process for current variation lengths regardless of the level of voltage VL, and thus has a relatively high calculation load. Therefore, where voltage VL has sharply decreased in a power running mode, detection of activation of a CID may be delayed due to the calculation of current variation lengths, or the CID activation detection performance may be degraded due to variation in the current sensor.

Hence, by combining the first and second embodiments, where voltage VL has decreased to such an extent that undervoltage signal UV of the DC/DC converter is output, it is possible to determine activation of a CID immediately without performing the calculation process for current variation lengths, and also determine activation of a CID using the current variation lengths before voltage VL sufficiently decreases. In this way, activation of a CID can be quickly detected while reducing an unnecessary calculation process.

FIG. 9 is a flowchart for illustrating details of processing of the control of detection of CID activation executed by ECU 300 in the third embodiment. The flowchart of FIG. 9 additionally includes step S111 in the flowchart described with FIG. 7 in the first embodiment. Description of the same steps as those in FIG. 7 is not repeated for FIG. 9.

Referring to FIGS. 1 and 9, where both of the system voltage sensors have a malfunction (YES in S100), and the gates of converter 120 are interrupted (S110), ECU 300 determines in S111 whether or not undervoltage signal UV from DC/DC converter 210 is ON.

Where undervoltage signal UV is OFF (NO in S111), ECU 300 causes the processing to proceed to S120, where it executes detection of activation of a CID using actual current variation length IBint and command current variation length IRint, in accordance with the processing from S120 to S160, as described in the first embodiment.

Conversely, where undervoltage signal UV is ON (YES in S111), the processing proceeds to S170, where ECU 300 determines that a CID has activated, without calculating actual current variation length IBint and command current variation length IRint.

By performing the control in accordance with the foregoing processing, it is possible to detect activation of a CID quickly while reducing an unnecessary calculation process.

It is noted that "SMR 115" in the present embodiment corresponds to one example of a "switching device" in the present invention. The "DC/DC converter" in the present embodiment corresponds to one example of a "voltage converting device" in the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100: vehicle; 110: power storage device; 111, 180, 185: voltage sensor; 112: current sensor; 115: SMR; 120: converter; 130, 135: inverter; 140, 145: motor generator; 150: power transmission gear; 160: engine; 170: driving wheel; 190: load device; 200: auxiliary equipment; 210: DC/DC converter; 220: auxiliary load; 230: auxiliary battery; 300: ECU; 310: current detecting unit; 320: command current calculating unit; 330: accumulating unit; 340: determining unit; 350: relay control unit; 360: drive control unit; C1, C2: capacitor; CID: current interrupt device; CL, CL1 to CLn: battery cell; D1, D2: diode; L1: reactor; NL1: ground line; PL1 to PL3: power line; Q1, Q2: switching element.

The invention claimed is:

1. A power supply system for supplying driving electric power to a load device, comprising:
 a power storage device electrically connected to said load device; and
 a control device,
 said power storage device including an interrupting device configured to activate where an internal pressure of said power storage device has exceeded a prescribed value to interrupt a conduction path of said power storage device,
 said load device including a voltage detecting unit for detecting a voltage applied to said load device, supply of electric power generated by a regenerative operation from said load device to said power storage device being stopped in response to a failure of said voltage detecting unit,
 said control device detecting presence or absence of activation of said interrupting device based on information from a signal outputting unit different from said voltage detecting unit,
 said signal outputting unit including a current detecting unit for detecting an actual current that is input to or output from said power storage device, and
 said control device calculating a variation length obtained by accumulating a magnitude of an amount of variation for each sampling period for said actual current, and a variation length obtained by accumulating a magnitude of an amount of variation for each sampling period for a command current to be input to or output from said power storage device set in accordance with requested electric power based on a user's operation, during a prescribed period of time, and determining presence or absence of activation of said interrupting device, based on the variation length of said actual current and the variation length of said command current.

2. The power supply system according to claim 1, wherein said control device uses a first threshold value and a second threshold value greater than said first threshold value, and determines that said interrupting device has activated when the variation length of said actual current is smaller than said first threshold value, and the variation length of said command current is greater than said second threshold value.

3. The power supply system according to claim 2, wherein a switching device is provided on a path connecting said power storage device and said load device, for switching between a conducting state and a non-conducting state between said power storage device and said load device, and
 said control device switches said switching device into the non-conducting state where it determines that said interrupting device has activated.

4. The power supply system according to claim 2, further comprising auxiliary equipment connected to said power storage device in parallel with said load device, wherein
 said signal outputting unit comprises a device of said auxiliary equipment that is configured to output a voltage decrease signal indicating that an input voltage has decreased while driving is being requested, and
 said control device detects presence or absence of activation of said interrupting device based on said voltage decrease signal from said device.

5. The power supply system according to claim 4, wherein said device includes a voltage converting device configured to step down voltage of electric power from said power storage device.

6. The power supply system according to claim 4, wherein a switching device is provided on a path connecting said power storage device and said load device, for switching between a conducting state and a non-conducting state between said power storage device and said load device, and
 said control device switches said switching device into the non-conducting state where it determines that said interrupting device has activated.

7. A vehicle comprising:
 a power storage device;
 a load device including a drive unit configured to generate driving force for said vehicle using electric power from said power storage device; and
 a control device,
 said power storage device including an interrupting device configured to activate where an internal pressure of said power storage device has exceeded a prescribed value to interrupt a conduction path of said power storage device,
 said load device including a voltage detecting unit for detecting a voltage applied to said load device, supply of electric power generated by a regenerative operation from said load device to said power storage device being stopped in response to a failure of said voltage detecting unit,
 said control device detecting presence or absence of activation of said interrupting device based on information from a signal outputting unit different from said voltage detecting unit,
 said signal outputting unit including a current detecting unit for detecting an actual current that is input to or output from said power storage device, and
 said control device calculating a variation length obtained by accumulating a magnitude of an amount of variation for each sampling period for said actual current detected by said current detecting unit, and a variation length obtained by accumulating a magnitude of an amount of variation for each sampling period for a command current to be input to or output from said power storage device set in accordance with requested electric power based on a user's operation, during a prescribed period of time, and determining whether said interrupting device has activated or not, based on the variation length of said actual current and the variation length of said command current.

8. The vehicle according to claim 7,
further comprising auxiliary equipment connected to said power storage device in parallel with said load device, wherein
said signal outputting unit comprises a device of said auxiliary equipment that is configured to step down voltage of electric power from said power storage device, and outputting a voltage decrease signal indicating that an input voltage has decreased while driving is being requested, and
said control device detects presence or absence of activation of said interrupting device based on said voltage decrease signal from said voltage converting device.

9. A method for controlling a power supply system including a power storage device for supplying driving electric power to a load device,
said power storage device including an interrupting device configured to activate where an internal pressure of said power storage device has exceeded a prescribed value to interrupt a conduction path of said power storage device, and
said load device including a voltage detecting unit for detecting a voltage applied to said load device,
said method comprising the steps of:
detecting a failure of said voltage detecting unit;
stopping supply of electric power generated by a regenerative operation from said load device to said power storage device in response to the failure of said voltage detecting unit; and
detecting presence or absence of activation of said interrupting device based on information from a signal outputting unit different from said voltage detecting unit,
said signal outputting unit including a current detecting unit for detecting an actual current that is input to or output from said power storage device, and
the step of detecting presence or absence of activation of said interrupting device including the steps of:
calculating a variation length obtained by accumulating a magnitude of an amount of variation for each sampling period for said actual current detected by said current detecting unit, during a prescribed period of time;
calculating a variation length obtained by accumulating a magnitude of an amount of variation for each sampling period for a command current to be input to or output from said power storage device set in accordance with requested electric power based on a user's operation, during said prescribed period of time; and
determining presence or absence of activation of said interrupting device based on the variation length of said actual current and the variation length of said command current.

10. The method for controlling the power supply system according to claim 9, wherein
said power supply system includes auxiliary equipment connected to said power storage device in parallel with said load device,
said signal outputting unit comprises a voltage converting device of said auxiliary equipment that is configured to step down voltage of electric power from said power storage device, and to output a voltage decrease signal indicating that an input voltage has decreased while driving is being requested, and
said step of detecting presence or absence of activation of said interrupting device includes detecting presence or absence of activation of said interrupting device based on said voltage decrease signal from said voltage converting device.

11. A power supply system for supplying driving electric power to a load device, comprising:
a power storage device electrically connected to said load device; and
a control device,
said power storage device including an interrupting device configured to activate where an internal pressure of said power storage device has exceeded a prescribed value to interrupt a conduction path of said power storage device,
said load device including a voltage detecting unit for detecting a voltage applied to said load device, supply of electric power generated by a regenerative operation from said load device to said power storage device being stopped in response to the failure of said voltage detecting unit,
said control device detecting presence or absence of activation of said interrupting device based on information from a signal outputting unit different from said voltage detecting unit,
said power supply system further comprising auxiliary equipment connected to said power storage device in parallel with said load device,
said signal outputting unit comprises a device of said auxiliary equipment that is configured to output a voltage decrease signal indicating that an input voltage has decreased while driving is being requested, and
said control device detecting presence or absence of activation of said interrupting device based on said voltage decrease signal from said device.

12. A vehicle comprising:
a power storage device;
a load device including a drive unit configured to generate driving force for said vehicle using electric power from said power storage device; and
a control device,
said power storage device including an interrupting device configured to activate where an internal pressure of said power storage device has exceeded a prescribed value to interrupt a conduction path of said power storage device,
said load device including a voltage detecting unit for detecting a voltage applied to said load device, supply of electric power generated by a regenerative operation from said load device to said power storage device being stopped in response to a failure of said voltage detecting unit,
said control device detecting presence or absence of activation of said interrupting device based on information from a signal outputting unit different from said voltage detecting unit,
said vehicle further comprising auxiliary equipment connected to said power storage device in parallel with said load device,
said signal outputting unit comprises a voltage converting device of said auxiliary equipment that is configured to step down voltage of electric power from said power storage device, and outputting a voltage decrease signal indicating that an input voltage has decreased while driving is being requested, and
said control device detecting presence or absence of activation of said interrupting device based on said voltage decrease signal from said voltage converting device.

13. A method for controlling a power supply system including a power storage device for supplying driving electric power to a load device,
said power storage device including an interrupting device configured to activate where an internal pressure of said power storage device has exceeded a prescribed value to interrupt a conduction path of said power storage device, and said load device including a voltage detecting unit for detecting a voltage applied to said load device, said method comprising the steps of:

detecting a failure of said voltage detecting unit;

stopping supply of electric power generated by a regenerative operation from said load device to said power storage device in response to the failure of said voltage detecting unit; and detecting presence or absence of activation of said interrupting device based on information from a signal outputting unit different from said voltage detecting unit, said power supply system including auxiliary equipment connected to said power storage device in parallel with said load device, said signal outputting unit comprises a voltage converting device of said auxiliary equipment that is configured to step down voltage of electric power from said power storage device, and outputting a voltage decrease signal indicating that an input voltage has decreased while driving is being requested, and the step of detecting presence or absence of activation of said interrupting device including the step of detecting presence or absence of activation of said interrupting device based on said voltage decrease signal from said voltage converting device.

* * * * *